United States Patent [19]

Poletto et al.

[11] Patent Number: 5,280,233
[45] Date of Patent: Jan. 18, 1994

[54] LOW-DROP VOLTAGE REGULATOR

[75] Inventors: Vanni Poletto, Camino; Marco Morelli, Livorno; Bruno Murari, Monza, all of Italy

[73] Assignee: SGS-Thomson Microelectronics, S.r.l., Agrate Brianza, Italy

[21] Appl. No.: 842,294

[22] Filed: Feb. 26, 1992

[30] Foreign Application Priority Data

Feb. 27, 1991 [IT] Italy .................. T091A 000137

[51] Int. Cl.$^5$ .............................................. G05F 1/59
[52] U.S. Cl. ........................................ 323/269; 323/274;
323/280; 323/281; 307/48; 307/66
[58] Field of Search ............... 307/43, 44, 46, 48,
307/64, 66; 323/268, 269, 272, 273, 274, 280, 281

[56] References Cited

U.S. PATENT DOCUMENTS

| | | | |
|---|---|---|---|
| 4,543,522 | 9/1985 | Moreau | 323/274 |
| 4,779,037 | 10/1988 | LoCascio | 307/48 |
| 5,025,203 | 6/1991 | Edwards | 323/269 |

Primary Examiner—Jeffrey Sterrett
Attorney, Agent, or Firm—Townsend and Townsend Khourie and Crew

[57] ABSTRACT

A voltage regulator comprising a first power switch connected between the input terminal and output terminal; a storage condenser connected to the input terminal via a one-way switch; a second power switch connected between the condenser and the input terminal; and a regulating element connected to the output terminal and driving the power switches in such a manner as to maintain the output voltage constant. For better distributing electric and thermal stress and improving the reliability and working life of the regulator by reducing the interference caused by switching of the two power switches, a drive device is provided between the regulating element and the switches for detecting the input voltage and the voltage of the condenser, and keeping both switches on as long as the input voltage is above two given thresholds, turning off the second switch when the input voltage is higher than the condenser voltage and below the first threshold, and turning off the first switch when the input voltage is lower than the condenser voltage and below the second threshold.

9 Claims, 2 Drawing Sheets

LOW-DROP VOLTAGE REGULATOR

BACKGROUND OF THE INVENTION

The present invention relates to a low-drop voltage regulator.

A voltage regulator is an electronic device primarily for supplying current to a load connected to its output, while maintaining the voltage at the output as constant as possible. For this purpose, the device presents an input pin from which it draws the current to the load plus its own operating current.

Voltage regulators are of two types: a first provides for maintaining a higher voltage at the output than at the input, and as such requires reactive elements (transformers, reactors) which represent a drawback in terms of cost, weight and size; the second operates conversely, and comprises capacitive elements, which are more advantageous in terms of the above drawbacks.

Capacitive regulators, to which the present invention relates, feature a storage condenser and a diode between the input and the condenser, which enable them to operate perfectly even if the input voltage is less than the output voltage, or indeed zeroed or inverted, for a limited length of time.

Voltage regulators must provide for:
a) maintaining a constant output voltage despite even rapid variations in supply voltage at the input or in output current; and
b) reliable, long-term performance, particularly in the case of automotive applications in which failure of the regulator may result in drastic consequences.

In particular, the regulator dealt with herein must provide for:
1) supplying the load with rated service voltage and current, even when the input voltage is extremely close to the rated load voltage (in particular, when the difference between the two voltages is roughly 0.5 V);
2) maintaining the rated voltage and current at the load, even in the event of a temporary interruption in supply, i.e. an input voltage equal to or less than the rated output voltage, including negative values;
3) maintaining operation as per point 2) for as long as possible. This depends on the amount of energy stored in the condenser (which in turn depends on the rated supply voltage and the size of the condenser) and the rate at which it is drawn off (which depends on the output current and the current consumed by the regulator itself).

A known voltage regulator featuring the above characteristics is described, for example, in EP-A-110.775 and illustrated by way of reference in FIG. 4. This device, numbered 10 in FIG. 4, presents an input terminal 11 connectable to a voltage source 12 (supplying input voltage $V_A$) and an output terminal 13 connectable to a load 14. Input terminal 11 is connected to the emitter of a first PNP power transistor 16, the collector of which is connected to output terminal 13, and the base of which is connected to the output of an operational amplifier 17 with a current output. Input terminal 11 is also connected to the anode of a diode 18, the cathode of which is connected to the emitter of a second PNP power transistor 19 also having its collector connected to output terminal 13 and its base connected to the output of amplifier 17. A condenser 21 is connected between the cathode of diode 18 and ground; and operational amplifier 17 presents its non-inverting input connected to output terminal 13, and its inverting input connected to a voltage source 22 supplying reference voltage $V_R$.

In the known circuit in FIG. 4, the emitter of transistor 16 is normally biased to a higher voltage than that of transistor 19, on account of the voltage drop $V_D$ in diode 18, whereas the two bases present the same potential. Consequently, transistor 19 is off, and load 14 is supplied with current by transistor 16.

Operational amplifier 17 ensures voltage $V_o$ of load 14 remains equal to reference voltage $V_R$. When output voltage $V_o$ falls below the above value, operational amplifier 17 draws off additional current from the base of transistor 16, so as to increase current supply from the collector of transistor 16 to the load, until output voltage $V_o$ is again equal to reference voltage $V_R$.

The above known circuit operates as described even in the event of input voltage $V_A$ falling to such an extent as to practically equal output voltage $V_o$. Transistor 16 in fact is capable of transferring current from the emitter to the collector until the difference in potential between the two equals the saturation voltage of transistor 16 (usually below 0.5 V).

Moreover, when operating as described above, in the event of input voltage $V_A$ falling suddenly, or even being zeroed or inverted, so that the voltage at the emitter of transistor 19 (equal to that of condenser 21) exceeds the voltage at the emitter of transistor 16 (equal to input voltage $V_A$), transistor 16 goes off, and transistor 19 comes on to supply the load.

Operation as described above is possible as long as the voltage of condenser 21 is higher than the rated output voltage (equal to $V_R$), i.e. as long as the voltage of the condenser equals the rated output voltage plus the saturation voltage of transistor 19 between the emitter and collector, as in the case of transistor 16. This operating mode is sustainable for a time interval $T_M$ equal to the time taken by condenser 21 to discharge. That is, if $V_{sat2}$ is the saturation voltage of transistor 19; $I_L$ the load current; and $I_B$ the current required for the circuit to function, said time interval equals:

$$T_M = \frac{(V_A - V_D) - (V_R + V_{sat2})}{I_C + I_B} \cdot C$$

With the following typical values: $V_A = 14$ V; $V_D = 0.7$ V; $V_R = 5$ V; $V_{sat2} = 0.5$ V; $I_C = 300$ mA; $I_B = 10$ mA; and $C = 220$ μF; this gives a time interval $T_M$ of 5.6 ms, after which it is no longer possible to supply the load. The above known circuit presents a number of drawbacks. Firstly, PNP transistors are large, high-cost components, each of which must be sized to withstand maximum output current and severe electric and thermal stress. This is especially critical when the regulator is employed under extreme operating conditions involving considerable instantaneous power dissipation, such as shortcircuiting at the output with a sharp rise in current; or high overvoltage at the input, as in the case of automotive applications; or when a strong overcurrent is requested during startup for bringing the output voltage $V_o$ up to the operating value in an extremely short space of time. All these situations impair the reliability and, in particular, the working life of the circuit.

Another drawback of the above known circuit lies in the switching of transistors 16 and 19. When switching from one to the other, it is highly probable that, for an albeit brief period of time, neither is operative, due to the slow startup capability of large-size PNP transistors, thus resulting in a brief interruption in current supply to the load. Moreover, switching occurs fairly frequently. Even a brief transient state capable of rapidly reducing input voltage $V_A$ by slightly more than $V_D$ (e.g. 1 V) and the emitter voltage of transistor 16 to below that of transistor 19 is sufficient for switching the two transistors and so causing interference at the output. Further interference is caused when the input voltage is restored or the condenser discharged, thus enabling transistor 16 and disabling transistor 19.

SUMMARY OF THE INVENTION

It is an object of the present invention to provide a highly reliable, long-life voltage regulator designed to minimize interference at the output caused by switching of the power elements of the regulator.

According to the present invention, there is provided a low-drop voltage regulator as claimed in claim 1.

BRIEF DESCRIPTION OF THE DRAWINGS

Two preferred non-limiting embodiments of the present invention will be described by way of example with reference to the accompanying drawings, in which.

DETAILED DESCRIPTION OF THE INVENTION

Figure 1:
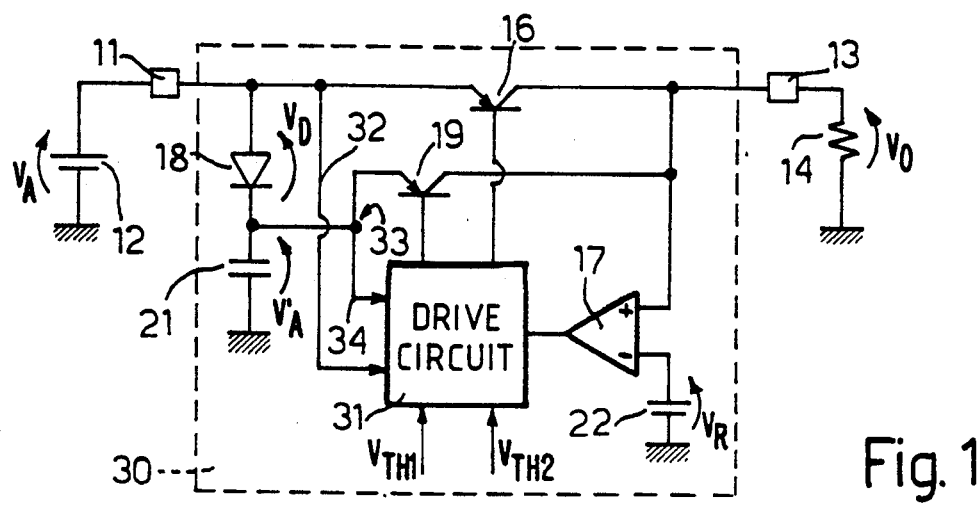
FIG. 1 shows an operating block diagram of the regulator according to the present invention.
Figure 4:
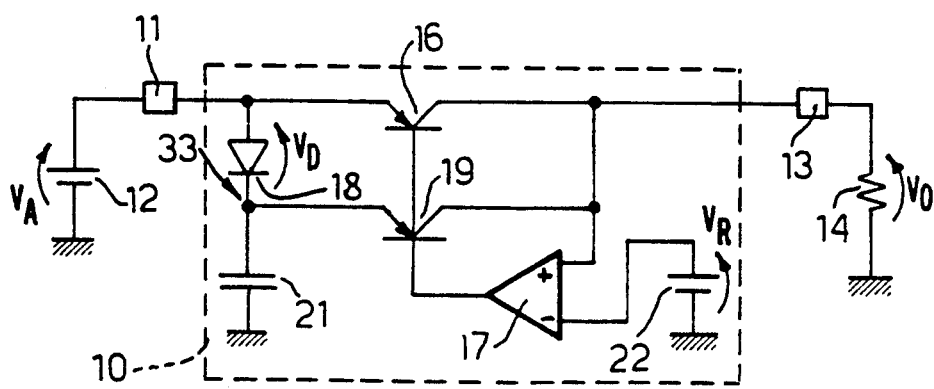
FIG. 4 shows a simplified electric diagram of a known regulator.

Regulator 30 in FIG. 1, in which the components similar to those of the known FIG. 4 circuit are indicated using the same numbering system, presents input and output terminals 11 and 13 connected respectively to voltage source 12 and load 14; two PNP transistors 16 and 19; diode 18; storage condenser 21; operational amplifier 17; and reference voltage source 22. Unlike the known circuit in FIG. 4, the base terminals of transistors 16 and 19 of the regulator according to the present invention are connected to a drive circuit 31 also connected to the output of operational amplifier 17. Circuit 31 is also connected to input terminal 11 over line 32, to the common point 33 between condenser 21 and the emitter of transistor 19 over line 34, and receives a first and second threshold voltage $V_{TH1}$ and $V_{TH2}$.

According to the present invention, the drive circuit keeps both transistors 16 and 19 on simultaneously, as long as input voltage $V_A$ along line 32 is higher than voltage $V_A'$ (plus the drop in diode 18) along line 34, and the first threshold voltage $V_{TH1}$. In the event of input voltage $V_A$ falling slowly below the first voltage threshold $V_{TH1}$, but remaining higher than the condenser voltage (plus the drop in diode 18), drive circuit 31 turns off transistor 19, so that the load is supplied solely by transistor 16. This operating mode is sustainable until the input voltage falls gradually to point where it equals the rated output voltage $V_R$ plus the saturation voltage of transistor 16, as in the known circuit.

If, on the other hand, input voltage $V_A$ falls sharply (i.e. faster than the discharge rate of condenser 21) so that $V_A < V_A' + V_D$ (thus disabling diode 18), the drive circuit again keeps both transistors 16 and 19 on as long as $V_A$ remains above the second threshold voltage $V_{TH2}$. Upon the input voltage falling further so that $V_A < V_{TH2}$, drive circuit 31 turns off transistor 16, so that the load is supplied solely by transistor 19. As in the known circuit, this operating mode is sustainable until the condenser discharges to equal rated output voltage $V_R$ plus the voltage drop between the emitter and collector of saturated transistor 19.

Figure 2:
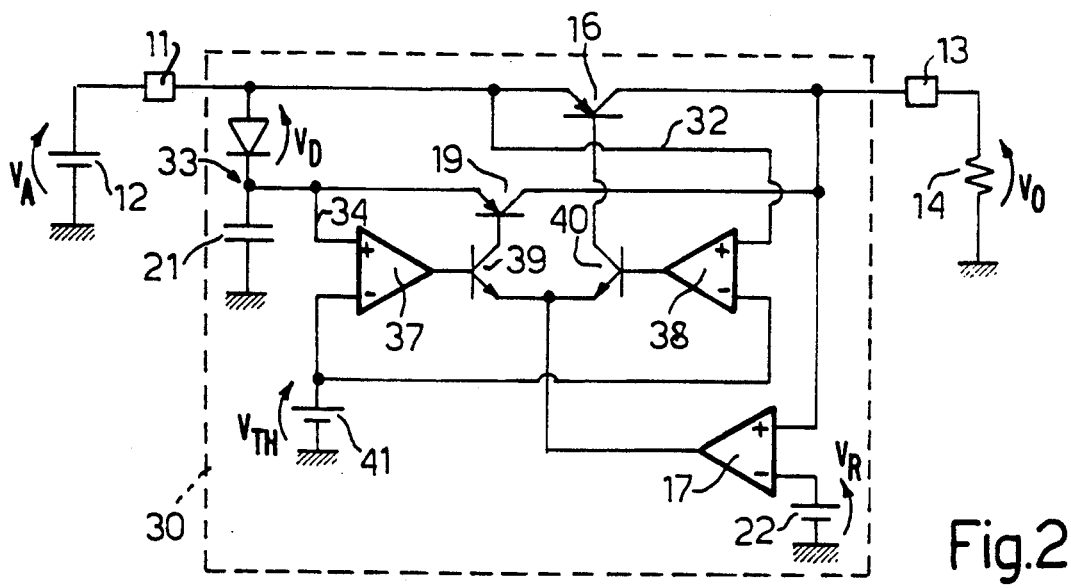
FIG. 2 shows a more detailed block diagram of one embodiment of the regulator according to the present invention.

FIG. 2 shows a more detailed block diagram of drive circuit 31 wherein $V_{TH1} - V_D = V_{TH2} = V_{TH}$, and circuit 31 consists of two comparators 37, 38, and two NPN transistors 39, 40 operating as switches. Threshold voltage $V_{TH}$ is supplied by voltage source 41. Comparator 37 presents its non-inverting input connected to common point 33 over line 34, and its inverting input connected to source 41; comparator 38 presents its non-inverting input connected to input terminal 11 over line 32, and its inverting input connected to source 41; transistor 39 presents its base terminal connected to the output of comparator 37, its emitter terminal connected to the output of operational amplifier 17, and its collector terminal connected to the base terminal of transistor 19; transistor 40 presents its base terminal connected to the output of comparator 38, its emitter terminal connected to the output of operational amplifier 17 (and the emitter of transistor 39), and its collector terminal connected to the base terminal of transistor 16.

Comparators 37, 38 drive respective transistors 39, 40 to achieve the operating mode described with reference to FIG. 1. That is, as long as the voltage at the respective non-inverting inputs is above threshold voltage $V_{TH}$ ($V_A$ and $V_a' > V_{TH}$), the outputs of comparators 37 and 38 present the same voltage for simultaneously driving transistors 39 and 40. In the event of a fall in input voltage, comparator 37 or 38 reduces its output voltage, thus turning off respective transistor 39 or 40, when its non-inverting input falls below threshold $V_{TH}$. In the event of both the non-inverting inputs of comparators 37 and 38 being simultaneously below threshold $V_{TH}$, the comparator whose non-inverting input is the first to fall below threshold $V_{TH}$ turns off respective transistor 39 or 40, while the other transistor is kept on even if the voltage at the non-inverting input of the respective comparator also falls below threshold $V_{TH}$.

Figure 3:
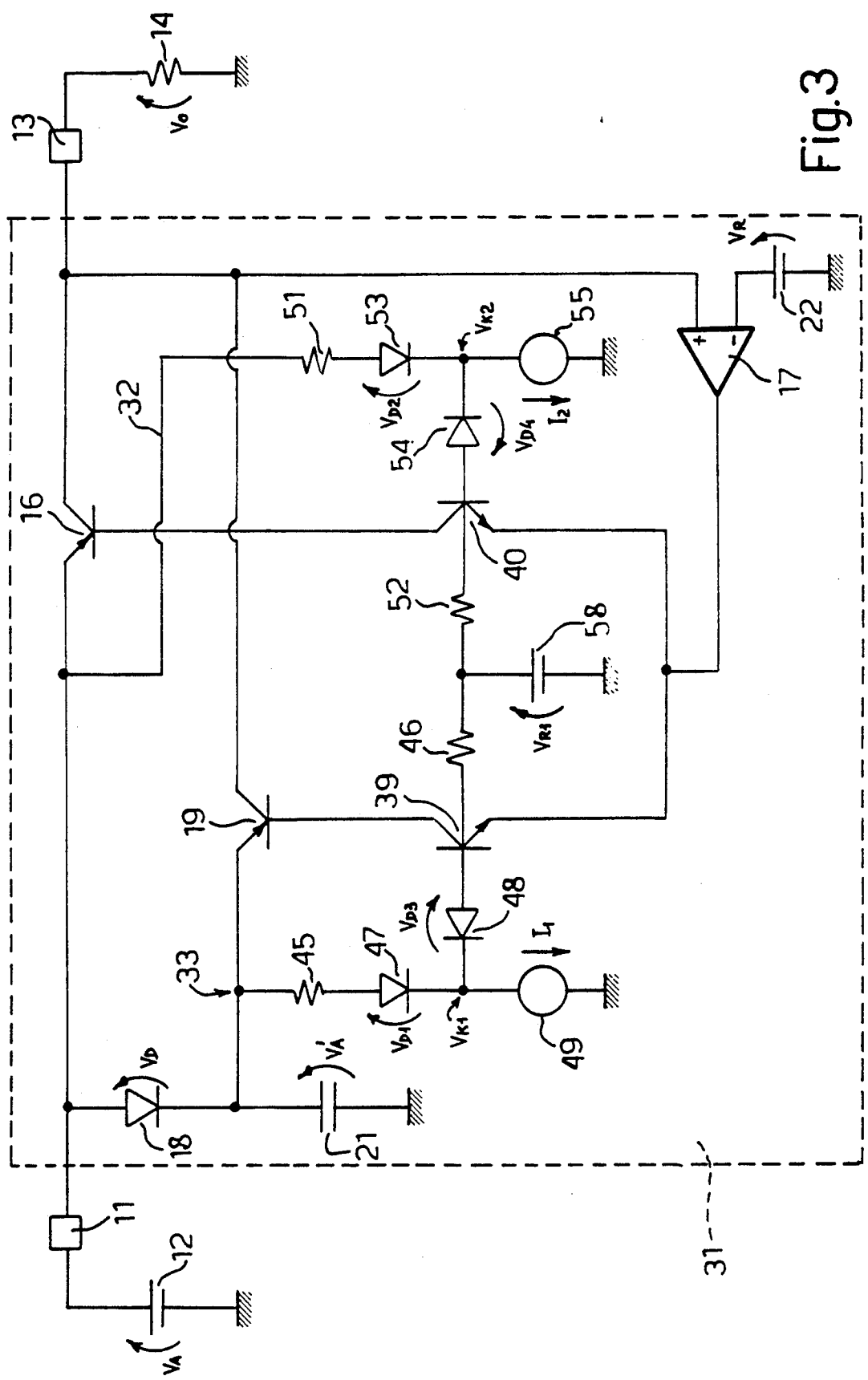
FIG. 3 shows a simplified electric diagram of the FIG. 2 embodiment.

FIG. 3 shows a more detailed embodiment of comparators 37 and 38, wherein comparator 37 consists of a first and second resistor 45, 46, a first and second diode 47, 48, and a current source 49; and comparator 38 of a third and fourth resistor 51, 52, a third and fourth diode 53, 54, and a current source 55.

First resistor 45 is connected between common point 33 and the anode of diode 47, the cathode of which is connected to the cathode of diode 48 and to one terminal of current source 49 supplying current $I_1$ and the other terminal of which is connected to ground (reference potential). The anode of diode 48 is connected to the base terminal of transistor 39 and to one terminal of resistor 46, the other terminal of which is connected to the positive pole of voltage source 58 at which is present voltage $V_{R1}$ in relation to ground.

Similarly, resistor 51 presents one terminal connected to line 32, and the other terminal connected to the anode of diode 53, the cathode of which is connected to the cathode of diode 54 and to one terminal of current source 55 supplying current $I_2$ and the other terminal of which is grounded. The anode of diode 54 is connected to the base terminal of transistor 40 and to one terminal of resistor 52, the other terminal of which is connected to the positive pole of voltage source 58.

The FIG. 3 circuit operates as follows. Under normal operating conditions, diodes 48 and 54 are disabled. In fact (disregarding the drop over resistors 46 and 52 due to the base currents of transistors 39 and 40) the cathode of the two diodes present respective voltages $V_{K1}$ and $V_{K2}$ equal to:

$$V_{K1} = V_A - V_D - I_1 R_1 - V_{D1}$$

and $$V_{K2} = V_A - I_2 R_2 - V_{D2}$$

(where $V_{D1}$ and $V_{D2}$ are the voltage drop in diodes 47 and 53 respectively, and $R_1$ and $R_2$ are the respective resistances of resistors 45 and 51) while the anodes of diodes 48 and 54 roughly present an appropriately low voltage $V_{R1}$ equal, for example, to $V_R$.

In this case, transistors 39 and 40 are both conductive in that they both present the same voltage drop between the base and emitter. As a result, power transistors 16 and 19 are both on, and provide simultaneously for supplying the load current in proportion to the selected geometry of transistors 39 and 40. In particular, both transistors 16 and 19 draw current from input 11 of the regulator, the first directly and the second via diode 18.

The above operating mode is maintained as long as diodes 48 and 54 remain disabled. When, however, input voltage $V_A$ falls slowly below the first threshold voltage $V_{TH1}$, diode 48 comes on. This occurs when the fall in input voltage causes volta $V_{K1}$ to fall to a value equal to the voltage at the anode of the diode plus the voltage drop in the diode when on, and in particular when:

$$V_A - V_D - I_1 R_1 - V_{D1} = V_{R1} - V_{D3}$$

where $V_{D3}$ represents the voltage drop in diode 48. In other words:

$$V_{TH1} = V_{R1} - V_{D3} + V_{D1} + I_1 R_1 + V_D$$

With the typical values indicated above, and assuming all the diodes present the same voltage drop, $V_{R1} = 5$ V and $I_1 R_1 = 1$ V, the above condition occurs when $V_A = 6.7$ V.

When the input voltage falls below this value, current $I_1$ is fed through diode 48, thus causing 46, a voltage drop substantially representing the difference in potential between the bases of transistors 39 and 40. The unbalance of the two transistors causes transistor 39 to go off, so that all the current at the output of operational amplifier 17 is supplied to transistor 40, transistor 19 goes off, and conduction of transistor 16 is increased for alone supplying the load current.

The above operating mode may continue indefinitely providing the difference in potential between the emitter and collector terminals of transistor 16 is higher than its saturation voltage $V_{sat1}$. In fact, should the input voltage continue falling, diode 54 also comes on, but with no change in the condition of transistors 16 and 19. In particular, in addition to causing a greater amount of current $I_1$ to be supplied to diode 48, a further fall in input voltage also turns on diode 54 when:

$$V_A - I_2 R_2 - V_{D2} = V_{R1} - V_{D4}$$

(where $V_{D4}$ is the drop in diode 54 when on).

The above condition, with $I_2 R_2 = V1$ V, is met when $V_A = 6$ V. At this point, the voltage at the base of transistor 40 begins to fall, but without turning on transistor 39, in that, assuming all the diodes present the same voltage drop and the resistors the same value, the voltage drop between the bases of transistors 39 and 40 is such that transistor 39 remains off. The above operating mode is maintained until input voltage $V_A$ falls below $V_R + V_{sat1}$, at which point the regulator goes off as in the known circuit.

When input voltage $V_A$ falls sharply below second threshold $V_{TH2}$ (falls sharply or is cut off, so that $V_A < V_{A'} + V_D$), diode 54 comes on. This occurs when a sharp fall in input voltage causes voltage $V_{K2}$ to fall to a value equal to the voltage at the anode of the diode plus the voltage drop in the diode when on, and in particular when:

$$V_A = V_{R1} - V_{D4} + V_{D2} + I_2 R_2$$

In other words:

$$V_{TH2} = V_{R1} - V_{D4} + V_{D2} + I_2 R_2$$

With the typical values shown, the above condition occurs when $V_A = 6$ V, in which case, diode 54 comes on, thus reducing the voltage at the base of transistor 40 as compared with transistor 39; all the current at the output of the operational amplifier is supplied to transistor 39; transistor 16 goes off; and conduction of transistor 19 is increased for alone supplying the load. At this stage, the input voltage may even be inverted (supported by the inversely-biased junctions of diodes 18 and 53 and transistor 16), and the load is supplied by transistor 19, which draws off energy from condenser 21 until the voltage of the condenser equals the rated output voltage $V_R$ plus the saturation voltage of transistor 19. The mechanism enabling saturation of transistor 19 when transistor 16 is off is the same as that, already described, enabling saturation of transistor 16 when transistor 19 is off.

The advantages of the present invention will be clear from the foregoing description.

Firstly, by virtue of the power transistors operating simultaneously, under all but exceptional circumstances of limited duration, the regulator according to the present invention provides for evenly distributing stress throughout most of the operating time, thus ensuring greater reliability and a longer working life of the regulator. This is particularly so when the regulator is employed under extreme operating conditions as described earlier, in which case, both the power transistors operate simutaneously, thus distributing heat over a wider surface area, with obvious advantages in terms of reliability.

Secondly, switching of either of the power transistors always occurs when the other is definitely on. In fact, the switching of either transistor as a result of a fall in input voltage merely results in increased conduction and not, as with known regulators, in startup of the other. This provides for a considerable improvement in response and, consequently, greater continuity in he supply of output current and voltage.

Thirdly, in addition to minimizing the problems caused by switching of the two transistors, the regulator according to the present invention also provides for minimizing the likelihood of such switching occurring. In fact, for transistor 16 to go off, the input voltage must fall below second threshold $V_{TH2}$, i.e. well below the rated voltage. In the example shown, with a rated input voltage of 14 V and a second threshold $V_{TH2}$ of 6 V, switching requires a voltage drop of 8 V as compared with 1 V in the case of the known circuit.

Finally, the regulator according to the present invention is straightforward in design, easy to produce, and involves relatively little additional cost, by virtue of the relatively small currents the additional components are required to withstand.

To those skilled in the art it will be clear that changes may be made to the regulator as described and illustrated herein without, however, departing from the scope of the present invention.

We claim:

1. A low-drop voltage regulator comprising an input terminal receiving an input voltage; an output terminal supplying an output voltage; a first power switch connected between said input and output terminals; a capacitive storage element connected to said input terminal via a one-way switch producing a standby voltage; a second power switch connected between said capacitive element and said output terminal; and a regulating element connected to said output terminal and said power switches, said regulating element detecting said output voltage and controlling said power switches in such a manner as to maintain said output voltage constant; characterized by the fact that, between said regulating element and said power switches, there is provided a drive device also connected to said input terminal and said capacitive element; said drive device comprising means for keeping both said power switches on as long as said input voltage remains above a first and second predetermined threshold value; means for turning off said second switch when said input voltage is higher than said standby voltage and below said first threshold value; and means for turning off said first switch when said input voltage is lower than said standby voltage and below said second threshold value.

2. A regulator as claim din claim 1, characterized by the fact that said drive device comprises a first comparator responsive to said input voltage and said second threshold value; a first switch device located between said regulating element and said first power switch and controlled by said first comparator; a second comparator responsive to said standby voltage and said first threshold value; and a second switch device located between said regulating element and said second power switch and controlled by said second comparator.

3. A regulator as claimed in claim 2, characterized by the fact that said first switch device comprises a first drive transistor; and said second switch device comprises a second drive transistor; said first and second drive transistors having emitter and collector terminals connected between said regulating element and said first and second power switches respectively, and having a base terminal connected to the output of said first and second comparators respectively.

4. A regulator as claimed in claim 2, characterized by the fact that said first and second threshold values are equal to each other minus a voltage value equal to the voltage drop in said one-way switch.

5. A regulator as claimed in claim 3, characterized by the fact that said first comparator comprises a first resistive branch between said input terminal and a reference potential line; a first controlled switch between the base terminal of said first drive transistor and the mid point of said first resistive branch; and a first resistive element between said base terminal of said first drive transistor and a first bias voltage source; and by the fact that said second comparator comprises a second resistive branch between said capacitive element and a reference potential line; a second controlled switch between the base terminal of said second drive transistor and the mid point of said second resistive branch; and a second resistive element between said base terminal of said second drive transistor and a second bias voltage source.

6. A regulator as claimed in claim 5, characterized by the fact that each of said first and second resistive element, a diode and a current source; said diode having its cathode terminal connected to said reference potential line via said current source; said mid point being defined by the connection point of said cathode terminal and said current source; and said further resistive element being connected between said input terminal and said mid point.

7. A regulator as claimed in claim 5, characterized by the fact that each said controlled switch comprises a diode having its anode terminal connected to said base terminal of a respective said drive transistor, and its cathode terminal connected to a respective said mid point.

8. A regulator as claimed in claim 5, characterized by the fact that said first and second bias voltage sources are defined by a single d.c. voltage source.

9. A regulator as claimed in claim 5, characterized by the fact that said first and second current sources are equal to each other, and said resistive elements are also equal to one another.

* * * * *